United States Patent [19]

Bishop et al.

[11] Patent Number: 4,726,912

[45] Date of Patent: Feb. 23, 1988

[54] STABLE SUSPENSIONS OF CARBOXYMETHYL CELLULOSE AND THEIR PREPARATION

[75] Inventors: Marshall D. Bishop; Robert M. Parlman, both of Bartlesville, Okla.

[73] Assignee: Phillips Petroleum Company, Bartlesville, Okla.

[21] Appl. No.: 907,556

[22] Filed: Aug. 27, 1986

[51] Int. Cl.$^4$ .............................................. B01J 13/00
[52] U.S. Cl. .................................. 252/309; 106/197.2; 137/13; 252/8.514; 252/8.554; 536/98
[58] Field of Search ............................ 252/309, 8.554; 106/197.2; 137/13; 536/98

[56] References Cited

U.S. PATENT DOCUMENTS

| | | | |
|---|---|---|---|
| 4,295,980 | 10/1981 | Motz | 252/8.554 |
| 4,309,535 | 1/1982 | Majewicz | 536/85 |
| 4,312,675 | 1/1982 | Pickens et al. | 106/171 |
| 4,325,861 | 4/1982 | Braun et al. | 523/205 |
| 4,330,414 | 5/1982 | Hoover | 252/8.5 A |
| 4,392,964 | 7/1983 | House et al. | 252/8.5 C |
| 4,401,813 | 8/1983 | Lowell et al. | 536/98 |
| 4,435,217 | 3/1984 | House | 106/171 |
| 4,453,979 | 6/1984 | DeMasi | 106/188 |
| 4,499,214 | 2/1985 | Sortwell et al. | 523/336 |

FOREIGN PATENT DOCUMENTS 926409  5/1963  United Kingdom .

*Primary Examiner*—Richard D. Lovering
*Attorney, Agent, or Firm*—Hal Brent Woodrow

[57] ABSTRACT

Carboxymethyl cellulose (CMC) with a moisture content in the range of 12 to 25 weight percent water can be formulated with hydrocarbon oils, anionic surfactants and suspending agents to provide stable suspensions. The suspended CMC does not tend to settle out and/or compact during extended periods of storage.

9 Claims, No Drawings

STABLE SUSPENSIONS OF CARBOXYMETHYL CELLULOSE AND THEIR PREPARATION

FIELD OF THE INVENTION

The invention relates to stable suspensions of carboxymethyl cellulose.

In one aspect this invention relates to pumpable suspensions with extended shelf life which provide a means for storing and/or transporting carboxymethyl cellulose as a stable liquid polymer formulation. The suspended polymer in these formulations does not tend to settle out and/or compact on standing.

In another aspect, this invention relates to a method for rapidly dispersing and/or dissolving carboxymethyl cellulose in water by contacting the instant stable suspensions with aqueous fluids such as field brines to solubilize, e.g., carboxymethyl cellulose into drilling fluids or into floodwaters for enhanced oil recovery.

BACKGROUND OF THE INVENTION

It is known to suspend carboxymethyl cellulose in a hydrocarbon oil to provide liquid polymer formulations. Although a number of these prior art formulations are useful, they suffer from various deficiencies such as short shelf life manifested in a tendency for the suspended polymer to settle and become compacted. Redispersion of the polymer in the oil cannot be effected by shaking or agitation. In addition, some of the prior art suspensions do not facilitate polymer dispersion in water.

Thus, there is a need for improved suspensions of carboxymethyl cellulose in hydrocarbon oil which provide compositions with extended shelf life and which facilitate polymer dispersion in water.

It is an object of this invention to provide stable suspensions of carboxymethyl cellulose (CMC) in a hydrocarbon oil. The suspended CMC in the instant suspensions does not tend to settle out and/or compact. Even after long periods of storage, the polymer remains in suspension and agitation of the stored suspension is minimal or not required.

It is a further object of this invention to provide stable suspensions of carboxymethyl cellulose in a hydrocarbon oil which on contact with aqueous fluids facilitate dispersion of the water soluble polymers in the water phase.

Other objects, aspects and advantages of the invention will be readily apparent to those skilled in the art from the following discussion and the appended claims.

INVENTION

In accordance with the present invention, we have discovered that the use of carboxymethyl cellulose having a moisture content of 12 to 25 weight percent water permits the formation of stable suspensions of CMC in a hydrocarbon oil which additionally contains anionic surfactants and suspending agents.

Such suspensions are readily pumpable and exhibit an extended shelf life as evidenced by the fact that the carboxymethyl cellulose does not tend to settle and compact.

These novel suspensions are also very effective in facilitating the dispersion of the suspended CMC in water.

DETAILED DESCRIPTION OF THE INVENTION

Suitable ranges for the four component inventive suspensions are as follows:

| | Wt. % of Components in Suspensions | |
|---|---|---|
| Component | Broad Range | Preferred Range |
| Hydrocarbon Oil | 49–31 | 48–35 |
| Suspending Agent | 20–2 | 5–2 |
| Anionic Surfactant[a] | 30–2 | 7–3 |
| Hydrated CMC[b] | 1–65 | 40–60 |

[a] The surfactant level is based on the weight of an anionic surfactant solution containing about 60 weight percent active ingredient.
[b] Hydrated CMC must have a moisture content of 12 to 25 weight percent water.

Although the instant four component compositions can be prepared by any order of mixing, it is preferred to first prepare a three-component mixture of oil, surfactant and suspending agent and then add the hydrated CMC last.

Suitable ranges for the components in the first mixture are as follows:

| | Wt. % of Components in Suspensions | |
|---|---|---|
| Component | Broad Range | Preferred Range |
| Hydrocarbon Oil | 50–90 | 80–88 |
| Suspending Agent | 20–4 | 8–5 |
| Anionic Surfactant[a] | 30–6 | 12–7 |

[a] The surfactant level is based on the weight of an anionic surfactant solution containing about 60 weight percent active ingredient.

HYDROCARBON OILS

Suitable hydrocarbon oils include mineral oils, diesel fuels, kerosene and other petroleum fractions. The paraffinic and isoparaffinic hydrocarbon oils are particularly preferred. The hydrocarbon oils have no substantial swelling effect on the water soluble polymer component.

ANIONIC SURFACTANTS

Suitable anionic surfactants are selected from the group consisting of petroleum sulfonates, alkaryl sulfonates and alkanesulfonates.

SUSPENDING AGENTS

Suitable suspending agents are selected from the group consisting of colloidal silica, precipitated silica and fumed silica. A hydrophobic fumed silica is presently preferred.

The following Examples further illustrate the invention.

EXAMPLE I

Commercial carboxymethyl cellulose with an initial water content in the range of 5 to 8 weight percent was ground to particle size 0.5% +60 mesh(+250 μm), 80% −200 mesh(−75 μm) and then hydrated by exposure to a humid atmosphere. The hydration was effected by placing the finely divided polymer on a flat surface some 20 inches below a canopy of polyethylene plastic sheeting and allowing a stream of steam to pass over the polymer for a period of 14 hours. The final moisture content of the hydrated polymer was 16.3 weight percent water.

A 5-gallon bucket of inventive composition was prepared by mixing the following components:

|     |                            |          |          |
| --- | -------------------------- | -------- | -------- |
| (a) | Hydrocarbon Oil[a]         | 6.960 Kg | 39.3 wt %|
| (b) | Anionic Surfactant[b]      | 0.720 Kg | 4.1 wt % |
| (c) | Suspending Agent[c]        | 0.444 Kg | 2.5 wt % |
| (d) | Hydrated CMC[d]            | 9.6 Kg   | 54.1 wt %|
|     | Total Wt.                  | 17.724 Kg|          |

[a]Soltrol ® 145 - a blend of $C_9$–$C_{14}$ isoparaffins with a boiling point range of 340–570 F. (171–299° C.).
[b]Orfom ® CO 733 - an aqueous solution of $C_{14}$–$C_{16}$ alkanesulfonates (60% active).
[c]Cab-O-Sil TS 720 - a hydrophobic amorphous fumed silica.
[d]Drispac ® - carboxymethyl cellulose with a moisture content of 16.3 weight percent water.

This 5-gallon sample on contact with water gave an immediate solution of polymer in water.

In order to demonstrate the stability of the suspension, the 5-gallon bucket of liquid polymer was transported on a delivery truck at ambient temperature for a period of six days over a distance of about 200 miles. At the end of this time period no settling or compaction of the suspended solids was visually detectable.

The suspension was subjected to three freeze-thaw cycles of 24 hours at −18° C. and 24 hours of +60° C. temperatures. The suspension was allowed to sit at ambient temperature and checked for settling periodically. After six months the test was terminated with no settling evident.

EXAMPLE II

Polymers with different levels of hydration were used to prepare stable suspensions. The suspensions were prepared in accordance with the following recipe:

|                       | Wt(g) | Wt. % |
| --------------------- | ----- | ----- |
| Hydrocarbon Oil[a]    | 116 g | 39.2  |
| Anionic Surfactant[b] | 12 g  | 4.1   |
| Suspending Agent[c]   | 7.4 g | 2.5   |
| Hydrated CMC[d]       | 160 g | 54.2  |

[a]Soltrol ® 145 - a blend of $C_9$–$C_{14}$ isoparaffins with a boiling point range of 340–570 F. (171–299° C.).
[b]Orfom ® CO 733 - an aqueous solution of $C_{14}$–$C_{16}$ alkanesulfonates (60% active).
[c]Cab-O-Sil TS 720 - a hydrophobic amorphous fumed silica.
[d]Drispac ® - carboxymethyl cellulose with hydration levels shown in Table I.

The suspensions were allowed to stand at ambient conditions and observed periodically for settling of the suspended polymer. Results are summarized in Table I.

TABLE 1

Suspensions of Hydrated Drispac ® Carboxymethyl Cellulose in Hydrocarbon Oils

| Run No. | Level of Hydration[a] (Wt. % Water) | Time Period[b] of Stability | Remarks |
| --- | --- | --- | --- |
| 1 | 5.8  | <1 day  | Commercial sample of Drispac ® carboxymethyl cellulose |
| 2 | 13.3 | 13 days | No settling |
| 3 | 13.9 | 13 days | No settling |
| 4 | 14.0 | 6 days  | No settling |
| 5 | 14.8 | 6 days  | No settling |
| 6 | 16.3 | 6 days  | No settling |
| 7 | 22.4 | 3 days  | Settling occurred after 3 days |

[a]The level of hydration was determined by drying the polymer samples to constant weight at 105° C.
[b]The time period corresponds to that span of time during which no settling or compaction of the suspended solids was visually detectable.

Referring to the invention runs in Table I (runs 2–7) it is evident that the hydrated Drispac ® carboxymethyl cellulose samples containing in the range of 13.3 to 22.4 weight percent water provided stable suspensions which exhibited no settling of solids over time periods varying from 3 to 13 days. Control run 1 involved the use of commercial Drispac ® carboxymethyl cellulose containing 5.8 weight percent water and the resulting suspension exhibited settling of suspended solids in less than one day.

Reasonable variations and modifications of the present invention which will become apparent to those skilled in the art can be made in this invention without departing from the spirit and scope thereof.

That which is claimed is:

1. A stable suspension comprising (A) a hydrocarbon oil, (B) at least one anionic surfactant, (C) hydrophobic fumed silica and (D) hydrated carboxymethyl cellulose wherein said carboxymethyl cellulose has a moisture content of 12 to 25 weight percent water.

2. The suspension according to claim 1 wherein said hydrocarbon oil is selected from the group consisting of paraffinic oils, isoparaffinic oils, diesel fuels and kerosene.

3. The suspension according to claim 2 wherein said anionic surfactant is selected from the group consisting of petroleum sulfonates, alkanesulfonates and alkaryl sulfonates.

4. The composition of claim 1 wherein said hydrocarbon oil is present in the range of 31 to 49 weight percent, the anionic surfactant is present in the range of 2 to 30 weight percent, the hydrophobic fumed silica is present in the range of 2 to 20 weight percent and the hydrated carboxymethyl cellulose is present in the range of 1 to 65 weight percent based on the total composition.

5. The suspension according to claim 1 wherein the hydrocarbon oil is isoparaffinic oil and said surfactant is alkanesulfonate.

6. The process of dispersing hydrated carboxymethyl cellulose by contacting the suspension of claim 1 with an aqueous fluid.

7. A process for stabilizing suspensions of carboxymethyl cellulose comprising:
   (a) hydrating said carboxymethyl cellulose to a moisture content of from 12 to 25 weight percent; and
   (b) mixing said hydrated carboxymethyl cellulose with a hydrocarbon oil, an anionic surfactant, and hydrophobic fumed silica.

8. The process of claim 7 wherein said hydrocarbon oil is an isoparaffinic oil, said anionic surfactant is an alkanesulfonate and said carboxymethyl cellulose has a moisture content of 12 to 25 weight percent water.

9. The process of claim 7 wherein said hydrocarbon oil is present in the range of 31 to 49 weight percent, said anionic surfactant is present in the range of 2 to 30 weight percent, said hydrophobic fumed silica is present in the range of 2 to 20 weight percent and said hydrated carboxymethyl cellulose is present in the range of 1 to 65 weight percent based on the total composition.

* * * * *